United States Patent
Smaglinski et al.

(10) Patent No.: US 12,546,952 B2
(45) Date of Patent: Feb. 10, 2026

(54) FIBRE OPTIC CABLE PLUGS AND FIBRE OPTIC CABLE CONNECTORS HAVING SUCH

(71) Applicant: HUBER+SUHNER Cube Optics AG, Mainz (DE)

(72) Inventors: Ingo Smaglinski, Mainz (DE); Thomas Petigk, Rüsselsheim (DE)

(73) Assignee: HUBER+SUHNER Cube Optics AG, Mainz (DE)

( * ) Notice: Subject to any disclaimer, the term of this patent is extended or adjusted under 35 U.S.C. 154(b) by 299 days.

(21) Appl. No.: 18/100,591

(22) Filed: Jan. 24, 2023

(65) Prior Publication Data

US 2023/0244040 A1 Aug. 3, 2023

(30) Foreign Application Priority Data

Jan. 28, 2022 (DE) .......................... 102022102057.6

(51) Int. Cl.
G02B 6/38 (2006.01)

(52) U.S. Cl.
CPC .......... *G02B 6/3853* (2013.01); *G02B 6/3825* (2013.01)

(58) Field of Classification Search
CPC .......... G02B 6/32; G02B 6/322; G02B 6/381; G02B 6/3834; G02B 6/3838; G02B 6/3843

(Continued)

(56) References Cited

U.S. PATENT DOCUMENTS

| 4,563,057 A | 1/1986 | Ludman et al. |
| 5,185,834 A | 2/1993 | Day et al. |

(Continued)

FOREIGN PATENT DOCUMENTS

EP 3508899 A1 7/2019

OTHER PUBLICATIONS

Search Report dated Aug. 19, 2022, issued in corresponding German Patent Application No. 102022102057.6.

(Continued)

*Primary Examiner* — Robert Tavlykaev
(74) *Attorney, Agent, or Firm* — Morgan, Lewis & Bockius LLP (57) ABSTRACT

Fibre optic cable plug for a fibre optic cable connector for optically connecting a first fibre optic cable to a second fibre optic cable, where the fibre optic cable plug holds an end section of the first fibre optic cable with a fibre optic cable end face and a lens with an entry face, which faces the first optical fibre cable, and an exit surface, which faces away from the first fibre optic cable. The lens is configured and arranged so that a beam bundle exiting the first fibre optic cable fibre passes onto the entry surface and is projected onto the exit surface as a converging beam bundle. Also, a fibre optic cable plug for optically connecting a first fibre optic cable to a second fibre optic cable has a first fibre optic cable plug, in which an end section of the first fibre optic cable is held with a first fibre optic cable end face, and a second fibre optic cable plug, in which an end section of the second optical fibre is held with a second fibre optic cable end face. A lens arranged between the first fibre optic cable end face and the second fibre optic cable end face so that a beam of light exiting the first fibre optic cable end face is reproduced onto the second fibre optic cable end face.

23 Claims, 4 Drawing Sheets

(58) Field of Classification Search
USPC .............. 385/65, 66, 68, 74, 79, 80, 84, 86
See application file for complete search history.

(56) References Cited

U.S. PATENT DOCUMENTS

| | | | | |
|---|---|---|---|---|
| 5,185,836 | A * | 2/1993 | Baker | G02B 6/2552 385/33 |
| 5,247,595 | A | 9/1993 | Foeldi | |
| 5,301,250 | A * | 4/1994 | Cheng | G02B 6/3855 385/76 |
| 5,499,310 | A * | 3/1996 | Ueda | G02B 6/3888 385/86 |
| 5,590,230 | A * | 12/1996 | Cheng | G02B 6/3888 385/136 |
| 6,203,211 | B1 * | 3/2001 | Cheng | G02B 6/3888 385/62 |
| 6,282,347 | B1 | 8/2001 | Ono et al. | |
| 6,592,267 | B1 * | 7/2003 | Cheng | G02B 6/3888 385/83 |
| 7,235,774 | B2 * | 6/2007 | Ishigami | G02B 6/4206 385/33 |
| 8,388,238 | B2 * | 3/2013 | Ohmura | G02B 6/3846 385/83 |
| 8,430,575 | B2 * | 4/2013 | Yu | G02B 6/32 385/74 |
| 9,645,325 | B2 * | 5/2017 | Fortusini | G02B 6/3885 |
| 10,234,638 | B2 * | 3/2019 | Zhang | G02B 6/3858 |
| 10,291,332 | B2 * | 5/2019 | Gudeman | G02B 6/12019 |
| 10,718,909 | B2 * | 7/2020 | Noll | B01L 3/502753 |
| 11,221,451 | B2 * | 1/2022 | Chu | G02B 6/3897 |
| 2002/0146211 | A1 | 10/2002 | Stevens et al. | |
| 2002/0159694 | A1 * | 10/2002 | Yano | G02B 6/32 385/33 |
| 2016/0266324 | A1 | 9/2016 | Akabane et al. | |
| 2017/0168244 | A1 * | 6/2017 | Rubino | G02B 6/3803 |
| 2021/0341682 | A1 | 11/2021 | Alkeskjold et al. | |
| 2023/0089044 | A1 * | 3/2023 | Konegawa | G02B 6/3861 385/79 |
| 2023/0251434 | A1 * | 8/2023 | Yakabe | G02B 6/3885 385/79 |

OTHER PUBLICATIONS

Extended European Search Report dated Jun. 9, 2023, issued in corresponding European Patent Application No. 23152328.3.

* cited by examiner

FIBRE OPTIC CABLE PLUGS AND FIBRE OPTIC CABLE CONNECTORS HAVING SUCH

The present invention relates to a fibre optic cable connector and a fibre optic cable plug for a fibre optic cable connector for the optical connection of two fibre optic cables.

Fibre optic cables are lines for transmitting light signals. Fibre optic cables often have fibres of quartz glass. They are also commonly referred to as glass fibre cables, even when glass fibres are not included.

Such fibre optic cables are particularly used in messaging to transmit information signals. However, such fibre optic cables are not infinitely long, so it is necessary to interconnect multiple fibres optic cables with each other. The connection is often made with plug or splice connections. In splicing, the fibre ends of two fibre optic cables to be connected are melted and pushed together. The plugs are typically used to detachably connect fibre optic cables.

Plug-plug connections are most commonly used here, which are designed to provide as little signal attenuation as possible. However, in the prior art, fibre optic cables with the same diameters (field diameters) usable for signal transmission are always connected to one another.

Typically, a distinction is made between mono-mode fibre optic cables and multi-mode fibre optic cables. However, these differ in their field diameters.

Hollow fibres, however, which comprise one or more cavities in cross-section, have also been known for some time. These can also be used to conduct light. In principle, such hollow fibres, also referred to as hollow core fibres, have advantages over full core fibres. However, the hollow core fibres can only recently be produced at acceptable costs in large lengths and of sufficient quality. That is why full core fibres have been and are still being used.

There are already optical signal transmission systems that use hollow fibres. However, it is not easy to connect multiple hollow fibres together. Moreover, it is not known how to couple a hollow core fibre to a full core fibre in a pluggable manner so that that the fibres cannot be used in combination. This is due, among other things, to the fact that the diameter (field diameter) usable for the light transfer in the hollow core fibres is about twice as large as the field diameter in the full core fibres. This has slowed the spread of hollow core fibres.

Starting from the described prior art, it is therefore the object of the present invention to specify a connection technique with which hollow core fibres can be connected to each other as well as to fibre optic cables having different field diameters, e.g. a full core fibre optic cable to a hollow core fibre optic cable.

With respect to the fibre optic plugs, this issue is solved by that the fibre optic cable plug holds an end section of a first fibre optic cable with a first fibre cable end face and having a lens with an entry surface facing the fibre optic cable and an exit surface facing away from the first fibre optic cable. The lens is configured and arranged such that a beam bundle exiting the first optical fibre cable enters the entry surface of the lens and is projected onto the exit surface of the lens as a converging beam bundle.

Information carried by the beam bundle is thus projected from the first optical fibre cable onto the exit surface and can be further processed or forwarded there.

It is particularly preferred when the beam bundle is focused on the exit surface of the lens.

Preferably, the diameter of the beam bundle on the exit surface is less than 100 μm, more preferably less than 25 μm, and most preferably less than 10 μm.

In a preferred embodiment, the first fibre optic cable is a hollow-core fibre optic cable.

In a preferred arrangement, the exit surface of the lens substantially corresponds to an exit surface of a second fibre optic cable, e.g., a full-core fibre optic cable, such that when the focus is selected accordingly, the entire light signal is focused on a portion of the exit surface whose extent substantially corresponds to the typical extent of the core of the second fibre optic cable. By the appropriate choice of the lens, the light signal can be adjusted to the core diameter of the second fibre optic cable in which a signal transmission is to be carried out.

The exit surface of the lens is convexly curved in a preferred embodiment.

The light-wave connector may be used for both signal transmission directions. Namely, if a light signal is provided on the exit surface of the lens, e.g. by a second fibre optic cable configured as a full core fibre optic cable, this is reproduced by the lens onto the end face of the first fibre optic cable configured as a hollow core fibre optic cable, for example.

In order to simplify the following description of the invention, only the case that a light signal is provided by the first optic fibre cable configured as hollow core fibre optic cable and is focused on the exit surface of the lens is described below. However, the fibre optic cable plug may also be used in the reverse direction of signal transmission. Also, instead of the hollow core fibre optic cable, a mono-mode or multi-mode glass fibre may be provided as the first fibre optic cable.

In a preferred embodiment, it is provided that the optical fibre optic cable plug comprises a base element having an input and an output surface between which a through-channel extends, wherein both end section of the hollow core fibre optic cable and at least a portion of the lens are arranged in the through-channel. The lens is arranged closer to the starting surface than the end section of the hollow core fibre optic cable.

The arrangement in the through-channel ensures that there are no external influences between the end face of the hollow core fibre optic cable and the entry surface, e.g. due to dust or moisture. As a result, the signal strength of the light signal is practically not reduced. It may be advantageous if the through-channel is sealed, i.e., both the end section of the hollow core fibre optic cable and the lens seal the through-channel from both sides.

In a further preferred embodiment, it is provided that the through-channel comprises two portions of different cross-sections, wherein the end section of the hollow core fibre optic cable is arranged at least partially in the smaller cross-section and the lens is disposed in the larger cross-section. In order to effectively focus the light signal on the exit surface, the lens must typically have a certain minimum diameter. Thus, the lens typically has a larger cross section than the hollow core fibre optic cable. The through-channel can therefore have a smaller cross section in the area in which the hollow core fibre optic cable is guided. This simplifies the fixation of the hollow core fibre optic cables within the through-channel. The through-channel may comprise a stop for the lens against which the lens abuts, so that movement of the lens towards the hollow core fibre optic cable is prevented. Alternatively, or in combination, the through-channel may comprise a stop for the hollow core fibre optic cable against which the hollow core fibre optic cable abuts, so that a lateral movement of the hollow core fibre optic cable towards the lens is prevented. Alternatively or in combination, the stop may also be configured to substantially and at best completely prevent lateral movement between the lens and/or hollow core fibre optic cables relative to the through-channel.

Such stops may be realised by through-channel portions having different cross-sections. If the basic element, and in particular the through-channel introduced therein, are precisely manufactured, the adjustment of hollow core fibre optic cables and lens can only be made in that the respective elements are positioned at the respective stop.

In a further preferred embodiment, it is provided that the exit surface of the lens closes the through-channel at the exit surface and is best flush. On the one hand, this measure ensures that no contaminations collect in the through-channel. On the other hand, the exit surface of the lens can be accessed, e.g. to clean it, without the through-channel having an interfering influence.

In a further preferred embodiment it is provided that the basic element comprises a transverse channel cutting the through-channel, wherein preferably the transverse channel fully traverses the basic element. Although the transverse channel need not necessarily be at right angles to the through-channel, this is usually the preferred embodiment. The through-channel may be engaged from outside through the transverse channel in order to adjust the hollow core fibre optic cable within the through-channel and to fix it using, for example, adhesive. Once the hollow-core fibre optic cable and lens are positioned exactly relative to each other, the hollow-core fibre optic cable may be fixed, e.g., glued, within the through-channel.

Therefore, in a particularly preferred embodiment, an adjustment device for adjusting the end section of the hollow core fibre optic cable is arranged in the transverse channel. This adjustment device may comprise a sleeve element having a transverse bore or a transverse recess, wherein the end section of the hollow core fibre optic cable is guided through the transverse bore or the transverse recess, respectively. If the sleeve element is now moved relative to the transverse channel and thus also relative to the through-channel, this leads to a movement of the end section of the hollow core fibre optic cable within the through-channel, whereby the end section of the hollow core fibre optic cable can be adjusted. For this, the hollow core fibre optic cable may be exposed to a signal and the light patch projected on the exit surface may be observed. Once this light patch has the desired properties (position on the exit surface, diameter of the light patch), i.e. once the hollow core fibre optic cable has taken on the desired relative position to the inlet surface of the lens, the end section can be glued within the through-channel.

It is possible, for example, that the sleeve element as well as the through-channel are filled with adhesive at least in sections in the area in which the end section of the hollow core fibre optic cable is arranged. In that case, the sleeve element remains in the fibre optic cable plug after adjustment.

It is also possible to set up the sleeve element in two parts, wherein the two parts coming from different directions of the transverse channel pass the end section of the hollow core fibre optic cable between each other. This embodiment facilitates insertion from the end section of the hollow core fibre optic cable and sleeve element.

In a further preferred embodiment, it is provided that the end face of the hollow core fibre optic cable and the lens are spaced apart from each other. This improves the imaging properties of the lens. In particular, this may reduce back reflectance. In a preferred embodiment, the lens comprises an anti-reflective coating. An anti-reflective coating may be arranged on the entry surface and/or the exit surface. If the lens has a refractive index $n_{Li}$ and the medium arranged in the through-channel, i.e., usually air, a refractive index $n_m$, the refractive index $n_1$ of the anti-reflective layer applied to the entry surface results in $n_1 = \sqrt{n_{Li} n_M}$.

With regard to the fibre optic cable connector, the above-mentioned task is solved in that a first fibre optic cable plug in which an end section of a first fibre optic cable is held with a first fibre optic cable end face and a second fibre optic cable connector in which an end section of a second fibre optic cable is held with a second fibre optic cable end face is provided. In so doing, a lens is arranged between the first fibre optic cable end face and the second fibre optic cable end face such that a light beam exiting the first optical fibre end face is depicted on the second optical fibre end face.

It is advantageous to have a fibre optic cable plug as the first fibre optic cable plug, as described above.

To simplify the following description of the fibre optic connector according to the invention, that following also only describes the case that a light signal is provided by the first fibre optic cable configured as hollow core fibre optic cable and is focused on the exit surface of the lens. In the case described below, a full-core fibre optic cable is provided as the second fibre optic cable. However, the fibre optic cable connector may also be used in the reverse direction of signal transmission. Also, instead of the hollow core fibre, a mono-mode or multi-mode glass fibre may be provided as the first fibre optic cable.

The lens is preferably arranged to contact the solid core end face. An anti-reflective coating may then be arranged on the exit surface. If the lens has a refractive index $n_{Li}$ and the core of the full core light cable has a refractive index of $n_F$, the refractive index $n_2$ of the anti-reflection layer applied to the exit surface should $n_{21} = \sqrt{n_F n_M}$ be equal.

Furthermore, a pre-loading device may be provided that pre-loads the initial surface of the lens against the solid core end face.

In a further preferred embodiment, a full core fibre optic cable is used as the second fibre optic cable whose core has a refractive index, which deviates by no more than 10%, preferably by no more than 3%, and best by no more than 1% from the refractive index of the lens.

For example, already known fibre optic connectors, such as LC plugs, may also be used to connect full core fibre optic cables to hollow core fibre optic cables, or to connect hollow core fibre optic cables to each other, or to connect full core fibre optic cables having different field diameters when the LC plug is configured as described.

Further advantages, characteristics, and possible applications of the present invention will become apparent from the following description of a preferred embodiment and corresponding figures. Here:

Figure 1:
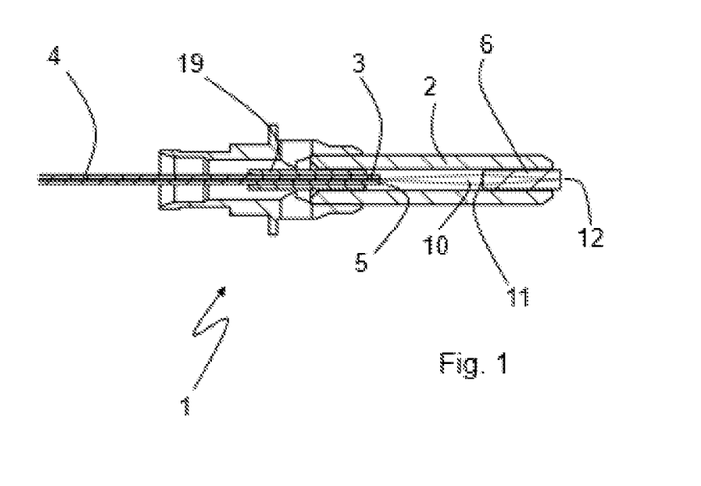
FIG. 1 shows a sectional view through an fibre optic cable plug with fibre optic cable.

In FIG. 1, a preferred embodiment of a fibre optic cable plug 1 is shown. An end section 3 of a hollow core fibre optic cable 4 is arranged in the fibre optic cable plug 1. This end section 3 is held in a through-channel 7, 8, 9 (shown in FIG. 2). Furthermore, a lens 6 is provided. A light beam or a beam of lights 10 emerges from an end face 5 of the end section 3 of the hollow core fibre optic cable 4 and widens towards the lens 6. The lens 6 is configured to project and preferably focus the light beam 10, which projects and preferably focuses on an entry surface 11 of the lens 6 as a converging beam bundle of jets onto the exit surface 12 of the lens 6. In the best case scenario, the exit surface 12 is the focus of the converging beam bundle. An arrangement outside the focus is also possible, even if this is disadvantageous.

In the embodiment shown, a capillary 19 is provided, which surrounds a part of the end section 3 of the hollow core fibre optic cable 4. The capillary 19 can be omitted. In this case, the through-channel is preferably formed staggered.

Although it is described based on the preferred embodiment that a light beam exits the end face 5 of the end section 3 of the hollow core fibre optic cable 4 and meets the lens 6 on the entry surface 11, the signal path may also be reversed. A signal coupled via the exit surface 12 of the lens 6 can also be reproduced onto the end face 5 of the end section 3.

Figure 2:
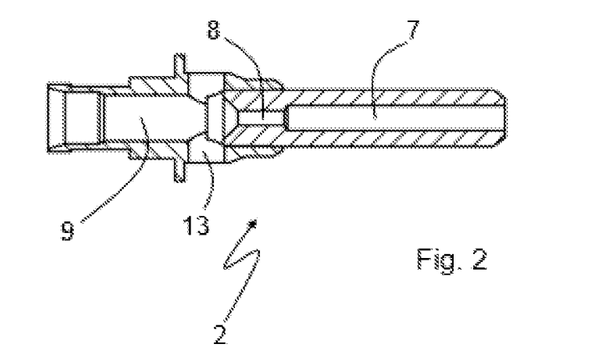
FIG. 2 shows a sectional view of a base element of the embodiment of FIG. 1.

The individual elements of the fibre optic connector are arranged in the base element 2 shown in FIG. 2. The basic element 2 has a through-channel, which in the embodiment shown has three sections, namely a front section 7, which is intended to receive the lens 6, a middle section 8, which is intended to receive the end section 3 of the hollow core fibre optic cable 4 and its cross section is reduced compared to the cross section of the front section 7. Finally, a rear section 9 of the through-channel follows, which again has a somewhat larger cross-section. The rear section 9 is of minor importance to the invention and may have any cross section.

Figure 3:
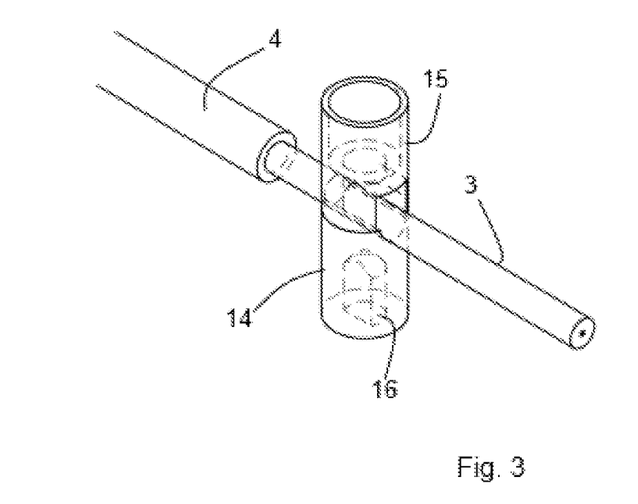
FIG. 3 shows a perspective view of the adjustment device of the embodiment of FIG. 1.

Furthermore, a transverse channel 13 is provided via which access to the through-channel is granted from the lateral surface of the base element 2. An adjustment device 14, 15, which is shown in FIG. 3, is arranged in the transverse channel 13. The adjustment device 14, 15 consists of two elements 14 and 15, which in the assembled state, as can be seen in FIG. 3, comprise a transverse bore or a transverse recess, through which the end section 3 of the hollow core fibre optic cable 4 can be guided. In the example shown, the lower element 14 of the adjustment device has a handling recess 16 indicated in the drawing, with which the adjustment device 14, 15 can be moved towards the transverse channel 13 and/or rotated about the axis of the transverse channel 13. The upper element 15 may also have a handling recess. The end section 3 of the hollow core fibre optic cable 4 can thus be adjusted relative to the base element 2. Once the relative position is set to the desired position, adhesive can be filled in via the opening of the sleeve-shaped part 15 of the adjustment device, such that the adhesive is distributed through the transverse recess 18 towards the end section 3 and there creates a fixed connection between the end section 3 and the base element 2 within the middle section 8 of the through-channel 7, 8, 9. The adjustment device 14, 15 can also be formed in one piece, wherein the end section 3 would then have to be guided through the transverse recess 18 of the adjustment device 14, 15. The two-part configuration has the advantage that the mounting of the waveguide plug is easier.

Figure 4:
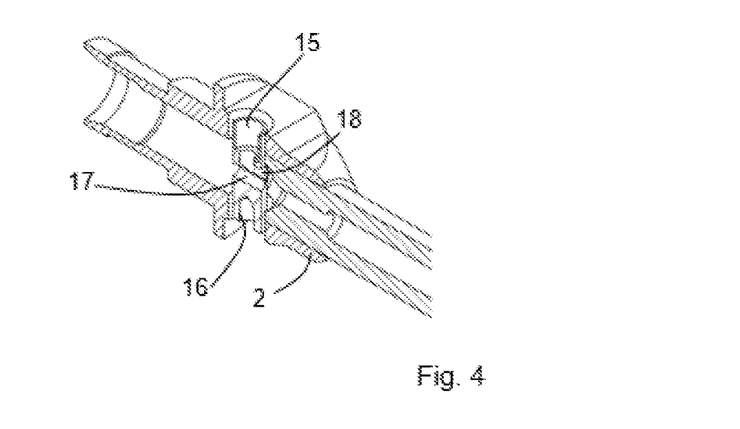
FIG. 4 shows a sectional view through the base element with the adjustment device of the embodiment of FIG. 1 inserted.
Figure 5:
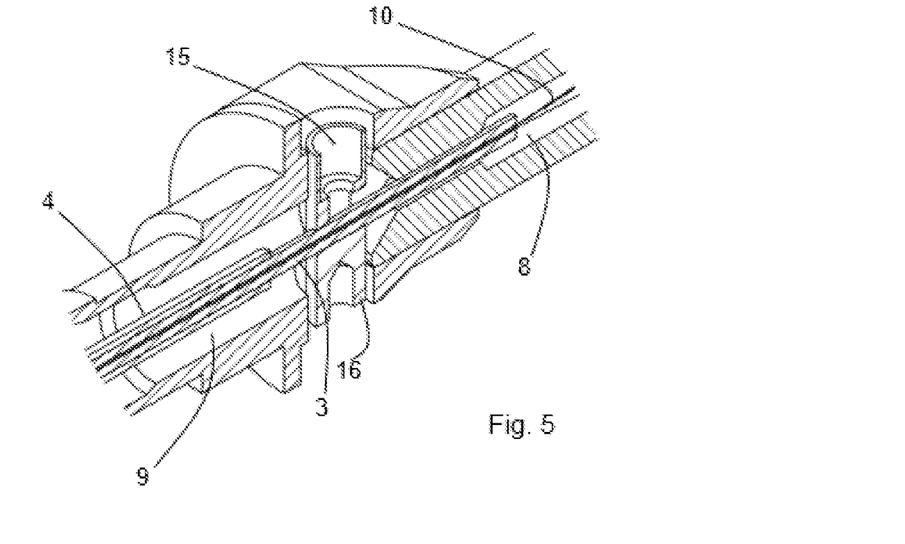
FIG. 5 shows a view as in FIG. 4, but with fibre optic cables inserted.

In FIGS. 4 and 5, two partial sectional views of the basic element 2 with the adjustment device 14, 15 inserted once without fibre optics (FIG. 4) and once with fibre optic plug (FIG. 5) are shown to be able to better detect the arrangement of the end section 3 within the adjustment device 14, 15. It can be seen here that the adjustment device 15, 16 comprises a transverse bore 17 into which the end section 3 can be inserted. In the direction of the central section 8 of the through-channel, the transverse bore 17 is connected to a recess 18 through which the adhesive can easily exit the sleeve-like element 15.

Figure 6:
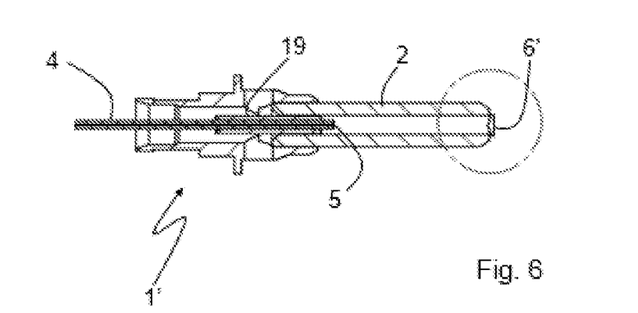
FIG. 6 shows a sectional view through an alternative embodiment of an fibre optic cable plug.

In FIG. 6, an alternative embodiment of a fibre optic cable plug 1' is shown. This embodiment substantially corresponds to the embodiment shown in FIG. 1, wherein, however, an alternatively formed lens 6' is provided. This lens may be made of quartz glass, silicon or SF11.

Figure 7:
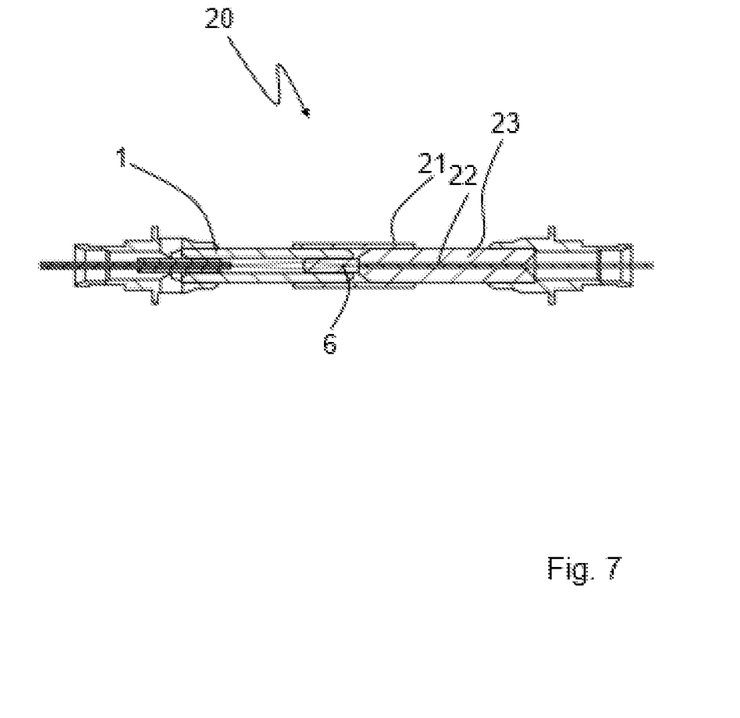
FIG. 7 shows a sectional view through a fibre optic cable connector.

In FIG. 7, a fibre optic cable connector 20 is shown. In the left part of FIG. 7, the fibre optic cable plug shown in FIG. 1 can be seen. In the right part of FIG. 7, a full-core fibre optic cable 22 is disposed within a ferrule 23, as is known from the LC plugs of the prior art. The ferrule 23 and the fibre optic cable plug 1 are arranged within a sleeve 21 with their end faces. The end face of the full core fibre optic cable 22 is pressed onto the exit surface 12 of the lens 6 so that physical contact exists.

LIST OF REFERENCE NUMBERS 1, 1 Fibre Optic Plug
2 Base element
3 End section
4 Hollow core fibre optic cable
5 End face of the hollow core fibre optic conductor
6, 6' Lens
7 Through-channel
8 Through-channel
9 Through-channel
10 Beam of light
11 Entry surface
12 Exit surface
13 Transverse channel
14 Adjustment device
15 Adjustment device
16 Handling recess
17 Bore
18 Recess
19 Capillary
20 Fibre optic cable connector
21 Full core fibre optic cable
22 Ferrule

The invention claimed is:

1. A fibre optic cable plug for a fibre optic cable connector for optically connecting a first fibre optic cable to a second fibre optic cable,
    wherein the fibre optic cable plug holds an end section of the first fibre optic cable with a fibre optic cable end face and a lens with an entry surface, which faces the first optical fibre cable, and an exit surface, which faces away from the first fibre optic cable,
    wherein the lens is configured and arranged such that a beam bundle exiting the first fibre optic cable propagates to the lens as an expanding beam bundle, impinges on the entry surface, and is projected onto the exit surface as a converging beam bundle that is focused on the exit surface.

2. The fibre optic cable plug according to claim 1,
wherein the fibre optic cable plug comprises a base element having an input and an output surface between which a through-channel extends, and
wherein both the end section of the first fibre optic cable and at least a portion of the lens are arranged in the through-channel.

3. The fibre optic cable plug according to claim 2,
wherein the through-channel comprises two portions of different cross-sections, and
wherein the end section of the first fibre optic cable is arranged at least partially in a smaller cross-section and the lens is disposed in a larger cross-section.

4. The fibre optic cable plug according to claim 2, wherein the lens is arranged entirely in the through-channel.

5. The fibre optic cable plug according to claim 4, wherein the exit surface of the lens is flush against the through-channel on the exit surface.

6. The fibre optic cable plug according to claim 2, wherein the base element comprises a transverse channel that cuts the through-channel.

7. The fibre optic cable plug according to claim 6, wherein an adjustment device for adjusting the end section of the first fibre optic cable is arranged in the transverse channel.

8. The fibre optic cable plug according to claim 7, wherein the adjustment device comprises a sleeve element with a transverse bore,
wherein the end section of the first fibre optic cable is guided through the transverse bore, and
wherein the sleeve element as well as the through-channel is filled with adhesive at least in sections in an area in which the end section of the first fibre optic cable is arranged.

9. The fibre optic cable plug according to claim 6, wherein the transverse channel completely traverses the base element.

10. The fibre optic cable plug according to claim 1, wherein the fibre optic cable end face of the first fibre optic cable and the entry surface of the lens are spaced apart from each other.

11. The fibre optic cable plug according to claim 1, wherein the first fibre optic cable is a hollow core fibre optic cable.

12. The fibre optic cable plug according to claim 1, wherein the fibre optic cable plug comprises a base element having an input and an output surface between which a through-channel extends,
wherein both the end section of the first fibre optic cable and at least a portion of the lens are arranged in the through-channel,
wherein the through-channel comprises two portions of different cross-sections,
wherein the end section of the first fibre optic cable is arranged at least partially in a smaller cross-section and the lens is disposed in a larger cross-section,
wherein the lens is arranged entirely in the through-channel,
wherein the base element comprises a transverse channel that cuts the through-channel,
wherein an adjustment device for adjusting the end section of the first fibre optic cable is arranged in the transverse channel,
wherein the adjustment device comprises a sleeve element with a transverse bore,
wherein the end section of the first fibre optic cable is guided through the transverse bore, and
wherein the sleeve element as well as the through-channel is filled with adhesive at least in sections in an area in which the end section of the first fibre optic cable is arranged.

13. The fibre optic cable plug according to claim 1, wherein the lens is made of a homogenous optical material having a constant refractive index $n_{Li}$.

14. The fibre optic cable plug according to claim 13, wherein the homogenous optical material is quartz glass, silicon or SF-11 glass.

15. The fibre optic cable plug according to claim 1, wherein the lens is a single lens.

16. A fibre optic cable connector for optically connecting a first fibre optic cable to a second fibre optic cable, comprising:
a first fibre optic cable plug holding an end section of the first fibre optic cable with a first fibre optic cable end face and a lens having an entry surface facing the first fibre optic cable and an exit surface facing away from the first fibre optic cable, and
a second fibre optic cable plug holding an end section of the second fibre optic cable with a second fibre optic cable end face,
wherein the exit surface of the lens of the first fibre optic cable plug is arranged to contact the second fibre optic cable end face, and
wherein the lens of the first fibre optic cable plug is configured and arranged such that a beam bundle exiting the first fibre optic cable propagates to the lens as an expanding beam bundle, impinges on the entry surface of the lens, is projected onto the exit surface of the lens as a converging beam bundle.

17. The fibre optic cable connector according to claim 16,
wherein the lens is arranged between the first fibre optic cable end face and the second fibre optic cable end face such that the beam bundle exiting the first fibre optic cable end face is reproduced onto the second fibre optic cable end face.

18. The fibre optic cable connector according to claim 17, wherein a pre-loading device is provided that pre-loads an output surface of the lens against the second fibre optic cable end face.

19. The fibre optic cable plug according to claim 16, wherein the first fibre optic cable end face and the entry surface of the lens are spaced apart from each other.

20. The fibre optic cable plug according to claim 16, wherein the lens is a single lens.

21. The fibre optic cable plug according to claim 16, wherein the converging beam bundle is focused on the exit surface.

22. A fibre optic cable plug for a fibre optic cable connector for optically connecting a first fibre optic cable to a second fibre optic cable,
wherein the fibre optic cable plug holds an end section of the first fibre optic cable with a first fibre optic cable end face and a lens with an entry surface, which faces the first optical fibre cable, and an exit surface, which faces away from the first fibre optic cable,
wherein the exit surface of the lens is arranged to contact a second fibre optic cable end face of the second fibre optic cable, and
wherein the lens is configured and arranged such that a beam bundle exiting the first fibre optic cable propagates to the lens as an expanding beam bundle, impinges on the entry surface, and is projected onto the exit surface as a converging beam bundle.

23. The fibre optic cable connector according to claim 22, wherein the lens is arranged between the first fibre optic cable end face and the second fibre optic cable end face such that the beam bundle exiting the first fibre optic cable end face is reproduced onto the second fibre optic cable end face.

\* \* \* \* \*